United States Patent [19]

Miller

[11] 4,258,836
[45] Mar. 31, 1981

[54] SPRING OPERATED CONE CLUTCH

[75] Inventor: Donald L. Miller, Horseheads, N.Y.

[73] Assignee: Facet Enterprises, Inc., Tulsa, Okla.

[21] Appl. No.: 919,532

[22] Filed: Jun. 26, 1978

[51] Int. Cl.³ ............................................. F16D 19/00
[52] U.S. Cl. .................................... 192/84 C; 192/90;
192/111 A
[58] Field of Search ..................... 142/84 C, 90, 111 A

[56] References Cited
U.S. PATENT DOCUMENTS 4,030,583   6/1977   Miller ................................. 192/84 C

*Primary Examiner*—Roy D. Frazier
*Attorney, Agent, or Firm*—Remy J. VanOphem

[57] ABSTRACT

A spring operated clutch in which the clutching members are urged into engagement by spring sets and drawn out of engagement by an electromagnetic coil acting on an armature member, to provide a fail safe design for automotive fan drive applications. The clutch incorporates a wear compensation arrangement which allows for wearing of the clutching surfaces while maintaining a constant air gap between the armature and the inner body. The arrangement includes a threaded connection between an outer body comprising one of the clutching members and the armature, with the outer body axially advanced on the armature after a wearing of the surfaces reduces the torque output of the clutch, the axial advance being created by an engagement of the armature with a stop surface on the output clutching member. The clutch operating springs consist of two sets of springs, one set acting on the outer body to preload the threaded connection, retarding relative movement between the outer body and armature to preclude inadvertent axial adjustments.

6 Claims, 2 Drawing Figures

SPRING OPERATED CONE CLUTCH

BACKGROUND OF THE INVENTION

This invention comprises clutch drive units, more particularly clutching units of the type which are spring engaged and electromagnetically disengaged so as to be fail safe, that is, in the event of electrical failure the drive through the unit is maintained. Such clutches are highly desirable in the context of automotive fan drives since, if there is an electrical failure in the power circuit to the clutch, it would be highly undesirable if the vehicle were disabled by such electrical failure.

Such electromagnetic operators for clutch units typically comprise an inner body and an armature which are brought into and out of engagement under the influence of the electromagnetic field set up by an electromagnetic coil. The armature is maintained in the axially spaced apart position by means of springs with an air gap between the armature and the inner body pole faces.

The magnetic flux passes through such gap and draws the armature and inner body axially together. The flux path generally comprises ferromagnetic materials except for the air gap which it must cross upon energization of the coil, and thus, this air gap comprises a substantial proportion of the reluctance of the overall magnetic flux path.

In the aforementioned type of clutch, the clutching surfaces, when engaged, relatively position the armature and inner body, and thus, if the clutching surfaces are subject to significant wear, the axial position of the inner body and armature would increase within increasing degrees of wear, increasing the air gap which must be crossed by the magnetic flux. The electromagnetic coil should, therefore, be sized to provide a sufficiently strong magnetic field to pass through the maximum air gap which may develop over the service life of the clutch and still reliably axially attract the armature and inner body into engagement. This necessitates the sizing of the electromagnetic coil to be considerably larger than it otherwise need be in order to account for the increasing air gap due to wear.

In U.S. Pat. No. 4,030,583 there is disclosed an arrangement for substantially overcoming the problems associated with increasing air gap with clutching surface wear. In that arrangement, a wear compensation feature is provided by providing a separate outer body rotatably secured to the inner body, but axially movable relative thereto. The outer body is provided with the first clutching surface engagable with the output clutching surface. The outer body is also threadably connected to the armature with spring operating means acting on the outer body to urge the outer body into clutching engagement. The armature is provided with an abutment surface which comes into engagement with the output member if the clutching surfaces have become worn. The abutment establishes the maximum air gap which may develop.

Upon the armature coming into abutment with the surface on the output member, it is driven relative to the outer body, which driving creates a relative axial movement therebetween tending to advance the outer body into clutching engagement with the output member clutching surface until the maximum torque is developed in the unit. Thereafter, the clutching surfaces engage with normal cycling of the clutch unit until enough wear has occurred to cause another cycle of wear compensation adjustment. Since the outer body and the armature are connected only through the threaded connection, relative movement of the outer body and armature could occur upon normal clutch engagement tending to defeat the wear compensation and cause excessive wear at the armature surfaces. Thus, in that arrangement a separate retarder is provided, which insures unidirectional movement of the threaded connection only in the direction tending to offset wear.

The separate retarder adds expense to the unit and it would be advantageous if the need for such a retarder could be eliminated without comprising either the effectiveness of the wear compensation factor.

Accordingly, it is the object of the present invention to provide an electromagnetically deenergized, spring operated drive unit of the type described in which the retarter acting between the armature and outer body member is eliminated while still providing the wear adjustment feature.

SUMMARY OF THE INVENTION

This and other objects which will become apparent upon a reading of the following specification and claims is achieved by providing radially offset spring sets for urging the armature outer body assembly into engagement with the output member. The spring force exerted on the armature by the radially inner most spring sets effect a preloading of the threaded connection such as to retard relative movement between the outer body and the armature upon the clutching surfaces coming into engagement to substantially prevent the incidence of relative movement between the outer body and the armature. The thread wear adjustment is allowed to occur in the normal fashion upon the armature coming into abutment with the locating surface on the output member.

DETAILED DESCRIPTION OF THE DRAWINGS

Figure 1:
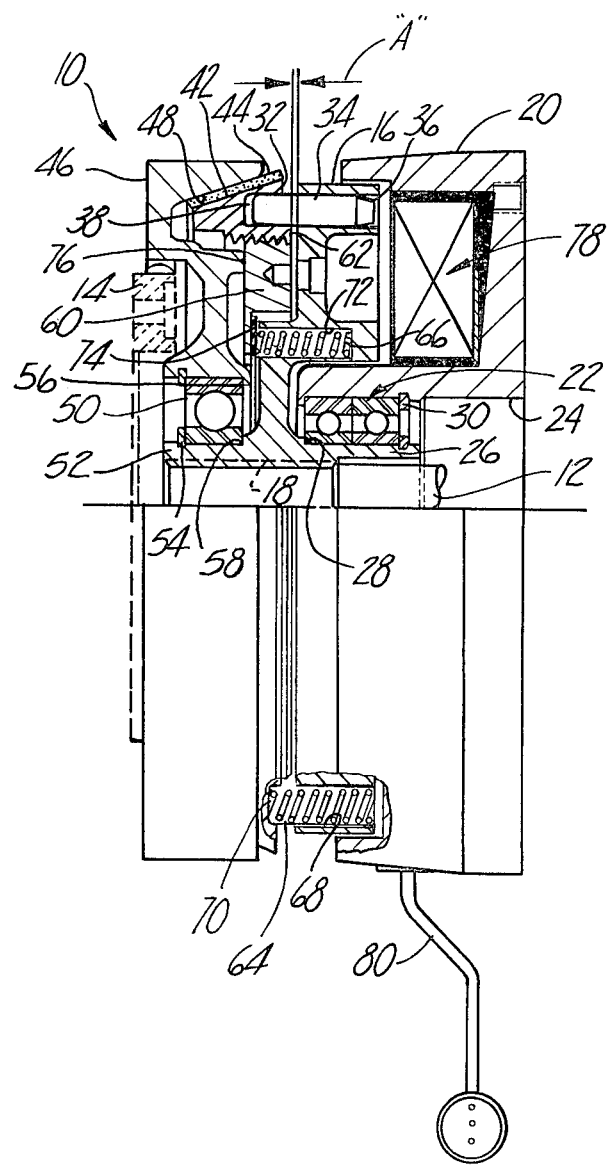
FIG. 1 is a view in partial longitudinal section of a clutch drive unit according to the present invention.
Figure 2:
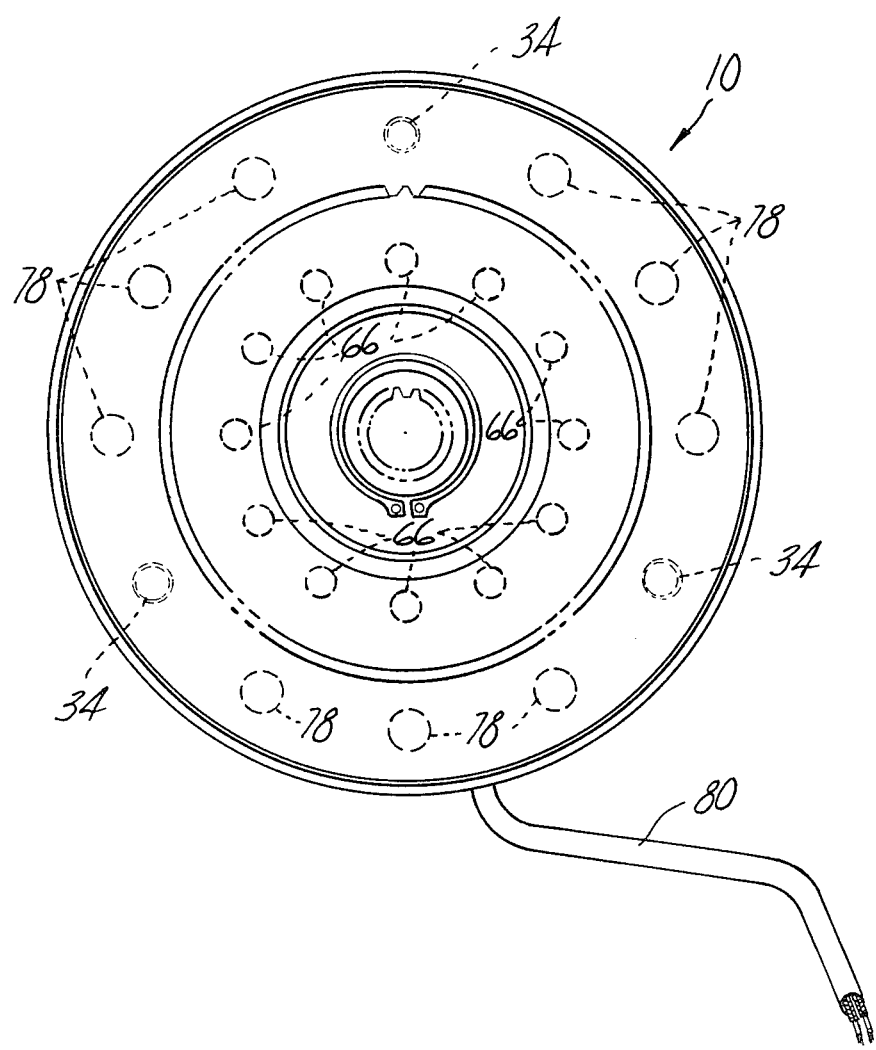
FIG. 2 is an endwise view of the clutch drive unit shown in FIG. 1.

In the following detailed description, certain specific terminology will be employed for the sake of clarity and a particular embodiment described in accordance with the requirements of 35 U.S.C. 112, but it is to be understood that the same is not intended to be limiting and indeed should not be so construed, inasmuch as the invention is capable of taking many forms and variations within the scope of the appended claims.

Referring to the drawings, the drive unit 10 controllably establishes a rotary connection between a first or input drive member 12, such as is provided by an engine driven shaft, and a second or output member 14, to which may be mounted an engine cooling fan.

The drive unit 10 includes a ferromagnetic inner body 16 adapted to be connected to the input member 12 by an internal spline 18. The inner body 16 is mounted for rotation on a stationary coil housing 20 by a double bearing set 22 received in an internal bore 24 formed in the coil housing 20, the double bearing set 22 receiving an extension 26 of the inner body 16. The inner body is also axially located by a shoulder 28 and a snap ring retainer 30.

Rotatably driven with the inner body 16 is an outer body member comprised of a driving cone 32, drivingly connected for rotation therewith by dowels 34 pressed into corresponding bores 36 in the inner body 16 and slidably received in pockets 38 formed into the radial face 40 of the driving cone 32. This arrangement allows relative axial movement therebetween while establishing the rotary drive. Other alternate arrangements include a splined connection.

The driving cone 32 is formed with a conical outer surface 42, to which is bonded or otherwise secured a layer 44 of a suitable friction material. The driving cone 32 is axially moveable into and out of frictional engagement with a hub member 46, formed with a correspondingly shaped conical seat 48.

The hub 46 rotatably mounted by a bearing 50 mounted on a second extension 52 of the inner body 16. The hub 46 is axially fixed by means of a pair of snap rings 54, a shoulder 56 formed on the hub 46 and a shoulder 58 formed in the inner body extension 52 so as to absorb the reaction of the engagement of the clutching surfaces.

In order to provide electromagnetically operated means for disengaging the drive cone 32 from the hub 46, a ferromagnetic armature plate 60 is mounted for axial movement with the drive cone 32, by means of a threaded connection therebetween at 62. This causes the armature 60 and the drive cone 32 to be axially moved together, but allows adjustment in the relative axial position by relative rotation on the threaded connection 62.

The armature 60 and drive cone 32 are urged axially so as to engage the drive cone 32 by two sets of compression springs 64 and 66. Compression springs 64 act directly on the drive cone 32, seated in pockets 68 formed on the inner body 16, and received in recesses 70 formed in a radial face of the drive cone 32.

Compression springs 66 are arranged about a radius inward from compression springs 64, disposed in pockets 72 in the inner body 16 and bearing against an antifriction washer 74 secured to the armature 60.

The armature 60 is located opposite a stop surface 76 which comes into abutment with a radial face of the armature 60, when the friction layer 44 has become worn, serving to define a maximum air gap "A" between the armature 60 and a radial face of the inner body 16.

An electromagnetic coil 78 is mounted in the stationary coil housing 20, which when energized via leads 80 by an external control circuit (such as a thermostatic switch for fan drive applications) draws the armature 60 into engagement with the inner body 16, disengaging the drive cone 32.

Upon deenergization of the coil 78, for any reason, the spring sets 64 and 66 again force the drive cone 32 into engagement with the cone surface 48 of the hub 46.

As noted above, after a predetermined extent of friction layer 44 wear, the stop surface 76 comes into engagement with the armature 60. This engagement tends to retard the armature 60, from rotating at the same relative speed as the drive cone 32 which is being driven at the input shaft speed by the dowels 34.

The threaded connection 62 is such that relative rotation between the drive cone 32 and armature 60 advances the drive cone 32 into tighter frictional engagement, increasing the force exerted by the spring sets 64 and 66 to thereby compensate for the friction lining wear.

According to the concept of the present invention, the exertion of at least a portion of the engagement spring pressure acting on the armature 60 by inner spring set 66 rather than entirely on the drive cone 32, preloads the threaded connection 62 such that inadvertant relative motion is avoided to prevent unwanted adjustment between the armature 60 and drive cone 32.

This relative motion tends to occur upon initial engagement of the drive cone 32 when the wear is within the limits such as to not produce an adjustment, since the inertia of the armature 60 tends to cause relative rotation resulting in unwanted changes in axial position of the drive cone 32 and armature 60.

Accordingly it can be seen that a separate retarder is not required to prevent inadvertant adjustments, tending to nullify the adjustments made by engagement of the stop surface 76 and the armature 60 to thus achieve the objects of the present invention.

It should be understood that the drive unit 10 according to the present invention is applicable to drive units which connect an input to either rotary or stationary outputs, i.e. clutch or brake units in the narrow sense. Also, "input" or "output" are relative terms depending on the external connections, and are used for reference only, such that the "input" shaft may be driven by the "output" shaft or vice versa.

Also, the concept has special application to cone clutches or brakes since lining wear has a relative great effect on the axial positioning of the members, but the concept is also applicable to other frictional clutch configurations, i.e. disc clutches.

What is claimed is:

1. In a spring operated electromagnetically released drive unit for controllably establishing a drive connection between first and second members, said drive unit including a rotatably supported ferromagnetic inner body adapted to be rotationally connected to said first member; an axially movable outer body adapted to be rotationally driven by said first member; a hub member connected to said second member and positioned to be frictionally engaged by said outer body by axial movement thereof in a first direction, and frictionally disengaged by axial movement in the opposite direction; electromagnetic release means moving said outer body in said opposite direction, including an electromagnetic coil, and a ferromagnetic armature mounted to be axially movable and drawn in said opposite axial direction into engagement with said inner body upon energization of said electromagnetic coil; said armature and said hub being formed with surfaces coming into abutment after a predetermined degree of wear of said outer body and hub portions in frictional engagement; spring operator means urging said outer body into frictional engagement with said hub; means connecting said armature and said outer body creating relative axial movement upon relative rotation therebetween, said connection axially connecting said armature and outer body, the improvement wherein:

said spring operator means includes first spring means acting on said armature urging said armature in said axial direction, said spring operator means further including second spring means acting directly on said outer body, said first and second spring means acting through the connection between said armature and said outer body, whereby said connection is thereby preloaded.

2. The drive unit according to claim 1, wherein said connection between said outer body and said armature comprises a threaded connection therebetween.

3. The drive unit according to claim 1, wherein said outer body comprises a drive cone, and wherein said hub is formed with a complementary conical surface engaged by said drive cone by axial movement in said one direction.

4. The drive unit according to claim 1, wherein said spring means acting on said armature and outer body includes respective radially offset sets of compression springs, one of said respective sets interposed between said inner body and said armature.

5. The drive unit according to claim 4, wherein said one of said respective sets is disposed in pockets in said inner body and wherein a thrust washer is interposed between said one set of compression springs and said armature.

6. A spring operated, electromagnetically released clutch comprising:
  a rotatably supported ferromagnetic inner body;
  an axially movable drive cone connected for rotation with said inner body;
  a rotatably supported, axially fixed hub member having a conical seat disposed and supported to be frictionally engaged by said drive cone upon continued axial movement of said drive cone in one direction;
  spring operator means urging said drive cone in said one direction;
  electromagnetic release means including an electromagnetic coil, a ferromagnetic armature mounted to be moved axially into engagement with said inner body upon energization of said coil and a threaded connection between said armature and said drive cone transmitting axial forces therebetween to thereby release said drive cone by said axial movement of said armature;
  wear adjustment means comprising two abutment surfaces contacted by said spring operator means after a predetermined extent of wear between said drive cone and conical seat, one of said surfaces being on said armature, the other on said inner body, whereby said contact drives said armature relative said drive cone, with said threaded connection producing an axial adjustment compensating for said wear;
  said spring operator means including radially offset compression spring sets, one of said spring sets acting between said inner body and said armature to preload said threaded connection and prevent inadvertent relative motion.

* * * * *

UNITED STATES PATENT OFFICE
CERTIFICATE OF CORRECTION

Patent No. 4,258,836   Dated March 31, 1981

Inventor(s) Donald Leroy Miller

It is certified that error appears in the above-identified patent and that said Letters Patent are hereby corrected as shown below:

Column 3, line 59, after "of" insert ----wear of----.

Column 3, line 60, after the numeral "44" delete "wear".

Signed and Sealed this

Eleventh Day of August 1981

[SEAL]

Attest:

Attesting Officer

GERALD J. MOSSINGHOFF

Commissioner of Patents and Trademarks